United States Patent
Yamamoto

(10) Patent No.: US 9,921,788 B2
(45) Date of Patent: Mar. 20, 2018

(54) IMAGE FORMING APPARATUS THAT EXECUTES A RESTART PROCESS IN A STATE WHERE A NETWORK PORT USED FOR COMMUNICATION WITH AN EXTERNAL DEVICE IS DISABLED

(71) Applicant: KYOCERA Document Solutions Inc., Osaka (JP)

(72) Inventor: Hirokazu Yamamoto, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 15/486,771

(22) Filed: Apr. 13, 2017

(65) Prior Publication Data

US 2017/0308336 A1    Oct. 26, 2017

(30) Foreign Application Priority Data

Apr. 20, 2016  (JP) ................................. 2016-084576

(51) Int. Cl.
| | |
|---|---|
| *G06F 15/00* | (2006.01) |
| *G06F 3/12* | (2006.01) |
| *G06K 1/00* | (2006.01) |
| *H04N 1/00* | (2006.01) |

(52) U.S. Cl.
CPC .......... *G06F 3/1234* (2013.01); *G06F 3/1203* (2013.01); *G06F 3/1236* (2013.01); *G06F 3/1288* (2013.01); *H04N 1/00244* (2013.01); *H04N 1/00411* (2013.01); *H04N 2201/0094* (2013.01)

(58) Field of Classification Search
CPC .... G06F 3/1234; G06F 3/1203; G06F 3/1236; G06F 3/1288; H04N 1/00244; H04N 1/00411
USPC ............................... 358/1.15, 1.1, 1.14, 1.13
See application file for complete search history.

(56) References Cited

U.S. PATENT DOCUMENTS

2005/0179931 A1    8/2005  Yamaguchi et al. ......... 358/1.14

FOREIGN PATENT DOCUMENTS

| JP | 2005-219247 A | | 8/2005 |
|---|---|---|---|
| JP | 2006113932 A | * | 4/2006 |

* cited by examiner

*Primary Examiner* — Douglas Tran
(74) *Attorney, Agent, or Firm* — Stein IP, LLC

(57) ABSTRACT

An image forming apparatus is provided with a communication portion that is connected to an external device via a network and communicates with the external device and a control portion that controls communication by the communication portion and executes a restart process for restarting the image forming apparatus. When a preset restart target error has occurred, the control portion executes the restart process in a state where a network port used for communication with the external device is disabled.

5 Claims, 5 Drawing Sheets

US 9,921,788 B2

IMAGE FORMING APPARATUS THAT EXECUTES A RESTART PROCESS IN A STATE WHERE A NETWORK PORT USED FOR COMMUNICATION WITH AN EXTERNAL DEVICE IS DISABLED

INCORPORATION BY REFERENCE

This application is based upon and claims the benefit of priority from the corresponding Japanese Patent Application No. 2016-084576 filed on Apr. 20, 2016, the entire contents of which are incorporated herein by reference.

BACKGROUND

The present disclosure relates to an image forming apparatus that is communicably connected to an external device.

When a hardware-based error or a software-based error has occurred in an image forming apparatus, the image forming apparatus no longer operates properly. In this case, the image forming apparatus may be restored to a normal state by executing a restart process for restarting the image forming apparatus. It is, however, bothersome for a user to perform an operation for restarting the image forming apparatus (such as an operation of turning on/off power to the image forming apparatus).

For this reason, conventionally, in a case where an error (a malfunction) has occurred in an image forming apparatus and there is a possibility that said error that has occurred could be corrected by restarting the image forming apparatus, the restart process is automatically executed. This saves the trouble of performing the operation for restarting the image forming apparatus.

SUMMARY

An image forming apparatus according to one aspect of the present disclosure is provided with a communication portion and a control portion. The communication portion is connected to an external device via a network and communicates with the external device. The control portion controls communication by the communication portion and executes a restart process for restarting the image forming apparatus. Further, when a preset restart target error has occurred, the control portion executes the restart process in a state where a network port used for communication with the external device is disabled.

DETAILED DESCRIPTION

A description is given of one embodiment of the present disclosure by using, as an example, a multi-functional peripheral (an image forming apparatus) equipped with a plurality of types of functions such as a copy function.

<Configuration of Multi-Functional Peripheral>

Figure 1:
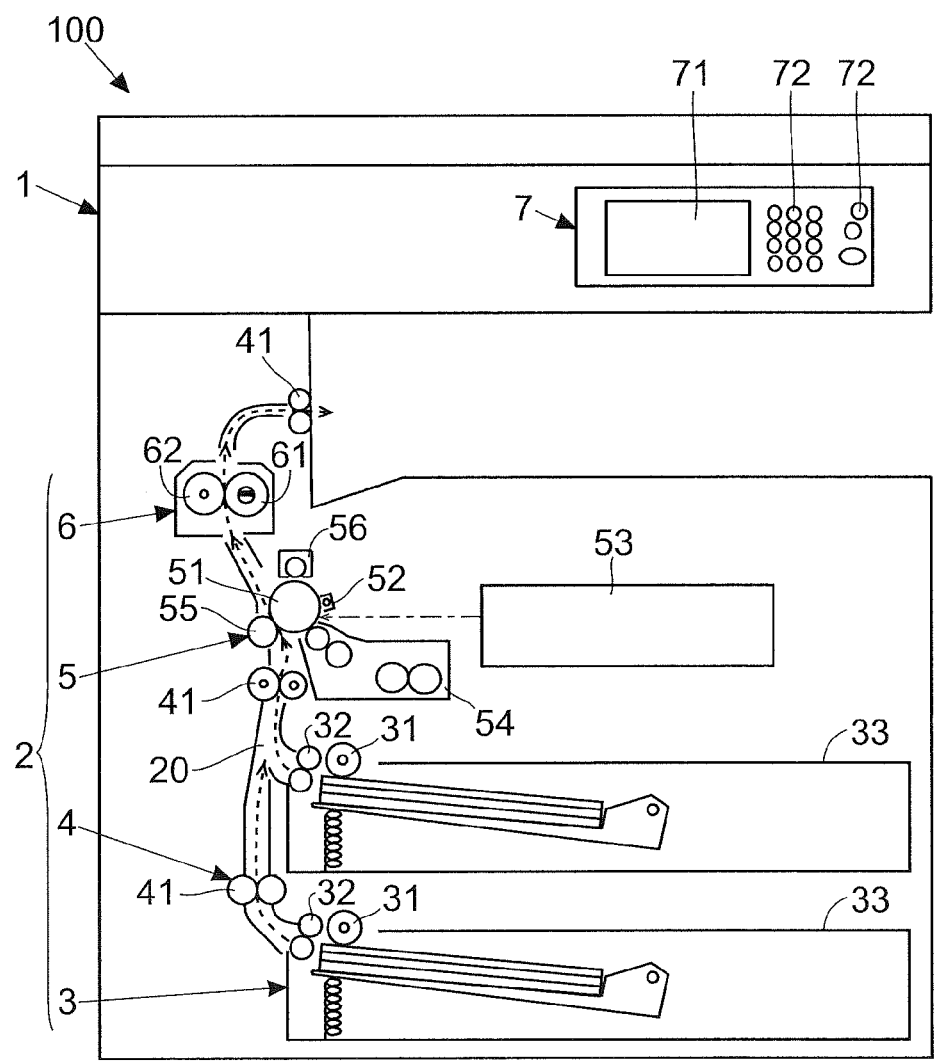
FIG. 1 is a diagram showing a configuration of a multi-functional peripheral according to one embodiment of the present disclosure.

As shown in FIG. 1, a multi-functional peripheral 100 of this embodiment is provided with an image reading portion 1 and a printing portion 2. The image reading portion 1 reads an original document and generates image data of the original document. The printing portion 2 conveys a paper sheet along a paper sheet conveyance path 20 and, based on the image data, forms a toner image. Further, the printing portion 2 transfers (prints) the toner image onto the paper sheet being conveyed.

The printing portion 2 is composed of a paper feed portion 3, a paper sheet conveyance portion 4, an image forming portion 5, and a fixing portion 6. The paper feed portion 3 includes a pick-up roller 31 and a paper feed roller pair 32 and supplies a paper sheet housed in a paper sheet cassette 33 to the paper sheet conveyance path 20. The paper sheet conveyance portion 4 includes a plurality of conveyance roller pairs 41 and conveys the paper sheet along the paper sheet conveyance path 20.

The image forming portion 5 includes a photosensitive drum 51, a charging device 52, an exposure device 53, a developing device 54, a transfer roller 55, and a cleaning device 56. Further, the image forming portion 5 forms, based on image data, a toner image and transfers the toner image onto a paper sheet. The fixing portion 6 incudes a heating roller 61 and a pressing roller 62 to heat and press the toner image transferred onto the paper sheet so that the toner image is fixed thereon.

The multi-functional peripheral 100 is provided also with an operation panel 7. The operation panel 7 includes a touch panel display 71. The touch panel display 71 displays, for example, a software key for accepting various types of settings and accepts the various types of settings from a user (accepts a touch operation with respect to the software key). Moreover, on the operation panel 7, hardware keys 72 such as a start key and a numeric keypad are also provided.

<Hardware Configuration of Multi-Functional Peripheral>

Figure 2:
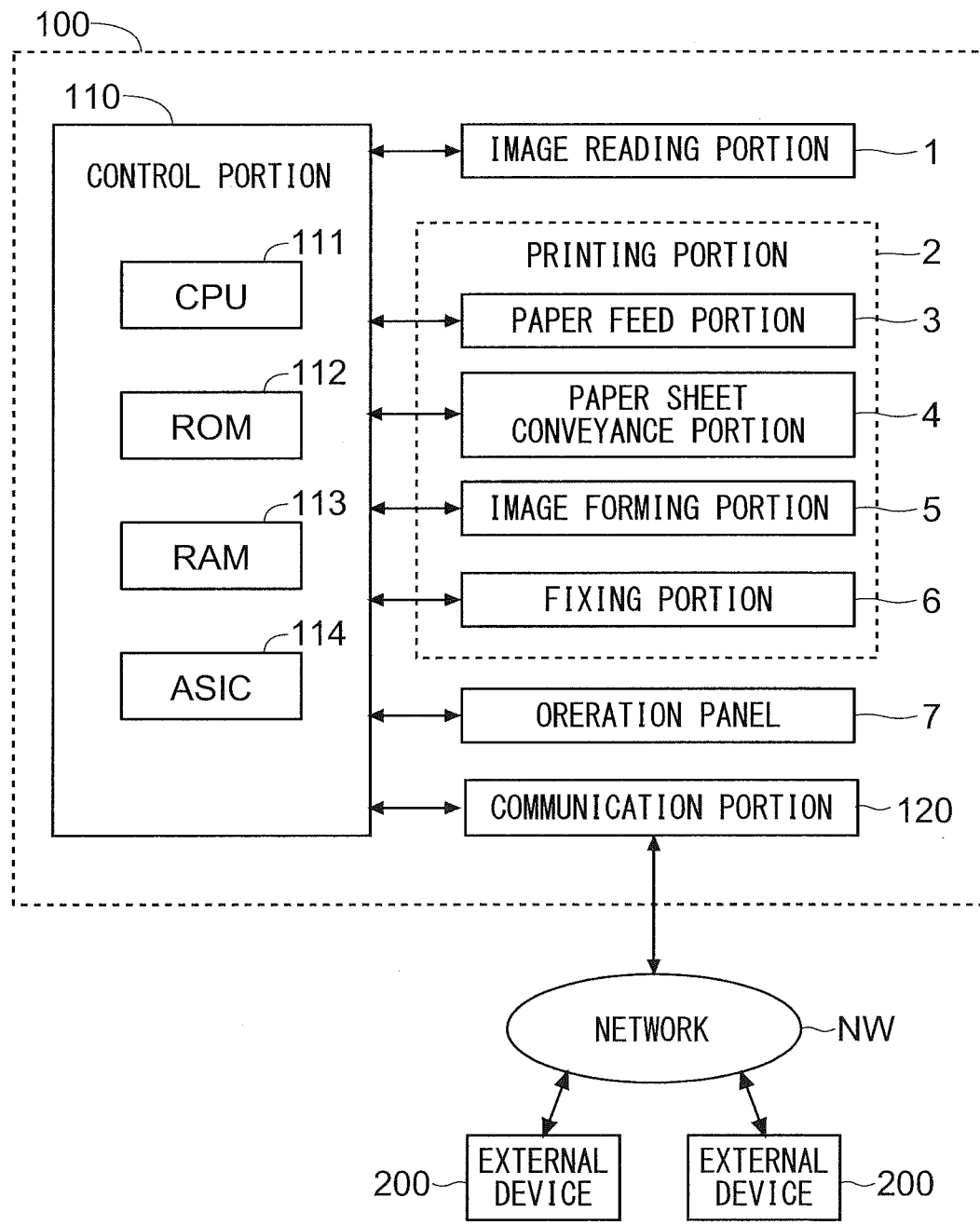
FIG. 2 is a diagram showing a hardware configuration of the multi-functional peripheral according to the one embodiment of the present disclosure.

As shown in FIG. 2, the multi-functional peripheral 100 is provided with a control portion 110. The control portion 110 includes a CPU 111, memory (nonvolatile memory and volatile memory) such as a ROM 112 and a RAM 113, and an ASIC 114.

The CPU 111 operates based on control programs and data and controls operations of the image reading portion 1 and the printing portion 2 (the paper feed portion 3, the paper sheet conveyance portion 4, the image forming portion 5, and the fixing portion 6). Furthermore, the CPU 111 controls an operation of the operation panel 7. Furthermore, the CPU 111 controls communication with an external device 200. The control programs and data are stored in the ROM 112 and expanded in the RAM 113. For example, a flash ROM is used as the ROM 112, and a dynamic RAM is used as the RAM 113.

The ASIC 114 executes, in a hardware-based manner, part or entirety of particular processing such as image processing or communication processing. For example, the ASIC 114 is connected to the image reading portion 1 and the printing portion 2. Further, upon an original document being read by the image reading portion 1, the ASIC 114 receives image data of the original document from the image reading portion 1, performs various types of image processing with respect to the image data, and converts the image data into image data for exposure (data for turning on/off a light-emitting element of the exposure device 53).

The multi-functional peripheral 100 is provided also with a communication portion 120 for performing communication via a network NW such as a LAN. The communication portion 120 includes a communication circuit and so on. Various types of the external devices 200 such as a user terminal (a personal computer used by a user of the multi-functional peripheral 100) and a server are connected to the network NW. Further, the control portion 110 accesses the network NW via the communication portion 120 so as to perform network communication with the external devices 200 (perform data transmission/reception via the network NW). Here, there exist a plurality of network ports (logical ports) used for network communication with the external devices 200 performed by the communication portion 120, and control of enabling/disabling the network ports (port numbers) is performed by the control portion 110. That is, the control portion 110 performs control of opening and closing the network ports.

<Start-Up Process (Restart Process) of Multi-Functional Peripheral>

Figure 3:
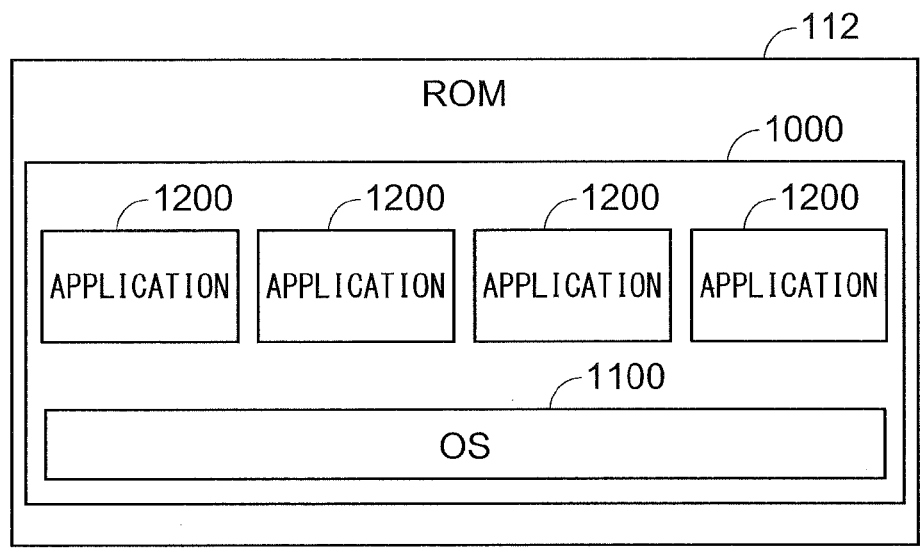
FIG. 3 is a diagram for explaining software stored in the multi-functional peripheral according to the one embodiment of the present disclosure.

As shown in FIG. 3, software 1000 (firmware) for performing hardware control is stored in the ROM 112. The software 1000 includes an operating system (OS) 1100. Furthermore, the software 1000 includes an application 1200 for executing various types of processing such as image processing and communication processing. Further, as a start-up process of the multi-functional peripheral 100, the control portion 110 (the CPU 111) executes a process of reading out the software 1000 to the RAM 113 and booting it up (a boot process).

Specifically, upon power-on of the multi-functional peripheral 100, in accordance with a boot program stored in the ROM 112, the control portion 110 reads out a kernel (a portion of the OS 1100 that is a core of the OS 1100) to the RAM 113 and starts up the OS 1100. Subsequently, the control portion 110 reads out the application 1200 to the RAM 113 and expands it.

Furthermore, upon boot-up of the software 1000, as the start-up process of the multi-functional peripheral 100, the control portion 110 performs adjustment of the various portions of the multi-functional peripheral 100 (the image reading portion 1, the printing portion 2, the communication portion 120, and so on). For example, voltage adjustment and light amount adjustment of the image forming portion 5, temperature adjustment of the fixing portion 6, and so on are performed as the start-up process. Moreover, a process of establishing communication with the external devices 200 connected to the communication portion 120 and so on are also performed.

Figure 4:
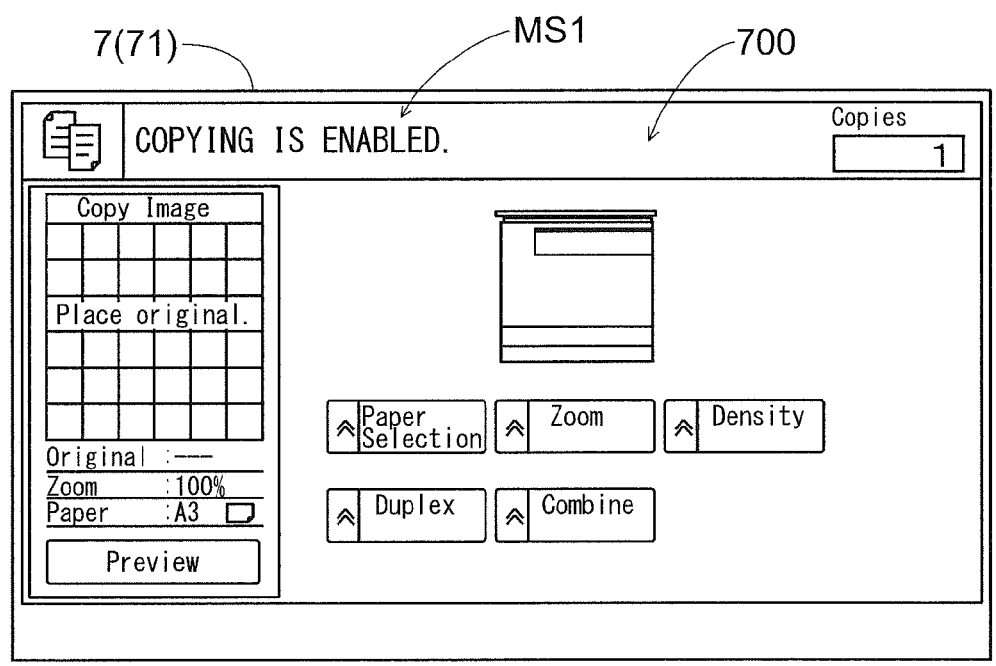
FIG. 4 is a diagram showing a setting screen displayed in the multi-functional peripheral according to the one embodiment of the present disclosure.

After that, the control portion 110 judges whether or not the start-up process has been completed properly. In a case where a result of the judgment shows that the start-up process has been completed properly, the control portion 110 controls the multi-functional peripheral 100 to be shifted to a ready state (a state of waiting for an instruction to execute various types of jobs such as a copy job). At this time, the control portion 110 controls the operation panel 7 to display a setting screen 700 as shown in FIG. 4 as an initial screen (a home screen). For example, on the setting screen 700, there is arranged a message MS1 to the effect that the multi-functional peripheral 100 has been shifted to the ready state (on the setting screen 700 shown in FIG. 4, a message "Copying is enabled."). While FIG. 4 shows, as one example, an example in which the setting screen 700 of a copy job is displayed as the initial screen, there is no particular limitation on a screen to be displayed as the initial screen.

Here, the control portion 110 judges whether or not, during the execution of the start-up process, a preset restart target error (a malfunction) has occurred. Further, in a case where the start-up process has not been completed properly due to occurrence of such a restart target error, the control portion 110 automatically executes a restart process (a reboot process). Moreover, also in a case where a restart target error has occurred after proper completion of the start-up process (after the multi-functional peripheral 100 has been brought to the ready state), the control portion 110 automatically executes the restart process.

For example, an error of such a type that the multi-functional peripheral 100 could be restored to a normal state by executing the restart process is preset as a restart target error, and information indicating the restart target error is stored beforehand. As one example, an error attributable to communication with the external device 200 (for example, an error caused by receiving unauthorized access from the external device 200 or receiving nonstandard data from the external device 200) is defined as a restart target error.

Upon occurrence of such a restart target error, in order to restart the multi-functional peripheral 100, the control portion 110 terminates an operation of the software 1000. Then, the control portion 110 executes the restart process.

<First Restart Process and Second Restart Process>

In this embodiment, upon occurrence of a restart target error, either of a first restart process and a second restart process is executed. In the first restart process, a conventional restart process is executed. In the second restart process, the restart process is executed in a state where a network port used for network communication with the external device 200 is disabled.

A selection as to whether the first restart process or the second restart process is to be executed is made by the control portion 110. For example, in executing the restart process, the control portion 110 determines the number of paper sheets that have been printed (may be referred to simply as a printed paper sheet number) since previous execution of a process for starting up the multi-functional peripheral 100. Said printed paper sheet number is counted by the control portion 110 and stored in the ROM 112 as selection criterion information (information used as a criterion for making a selection as to whether the first restart process or the second restart process is to be executed).

Further, upon detecting occurrence of a restart target error, the control portion 110 confirms a printed paper sheet number indicated by the selection criterion information. When a result thereof shows that the printed paper sheet number is not less than a preset threshold paper sheet number, the control portion 110 executes the first restart process, while when the printed paper sheet number is less than the threshold paper sheet number, the control portion 110 executes the second restart process. For example, the threshold paper sheet number is 1. A set value of the threshold paper sheet number may be variable.

Here, in a case where printing has not been performed since previous execution of the process for starting up the multi-functional peripheral 100 until current occurrence of a restart target error, there is a possibility that there has occurred a restart target error (a software-based error) attributable to communication between the multi-functional peripheral 100 and the external device 200, such as unauthorized access from the external device 200 to the multi-functional peripheral 100. In this case, even when the first restart process (the restart process performed in a state where the multi-functional peripheral 100 and the external device 200 can communicate with each other) is performed, since access from the external device 200 to the multi-functional peripheral 100 is enabled, there can occur an inconvenience that the multi-functional peripheral 100 fails to start up properly. On the other hand, in a case where printing has been performed since previous execution of the process for starting up the multi-functional peripheral 100 until current occurrence of a restart target error, there is a possibility that a hardware-based error has occurred during the printing, and thus it is not necessarily the case that there has occurred an error attributable to communication between the multi-functional peripheral 100 and the external device 200. Based on this, the threshold paper sheet number is set to 1. Further, when a printed paper sheet number is less than the threshold paper sheet number (i.e. when printing has not been performed), the control portion 110 executes the second restart process.

As one example, it is assumed that, after proper start-up of the multi-functional peripheral 100, a printed paper sheet number has reached the threshold paper sheet number and then a restart target error has occurred. In this case, the printed paper sheet number indicated by the selection criterion information is not less than the threshold paper sheet number. Thus, from between the first restart process and the second restart process, the control portion 110 selects the first restart process (does not disable a network port).

As another example, it is assumed that, during execution of the process for starting up the multi-functional peripheral 100 (the start-up process or the restart process), a restart target error has occurred. In this case, since the error that has occurred in the multi-functional peripheral 100 is a restart target error, the control portion 110 executes the restart process. Here, the current restart process is executed in response to a fact that the error has occurred during execution of the previous start-up process or restart process, and thus a printed paper sheet number indicated by the selection criterion information is less than the threshold paper sheet number (a printed paper sheet number since previous execution of the process for starting up the multi-functional peripheral 100 is 0). Thus, from between the first restart process and the second restart process, the control portion 110 selects the second restart process (disables a network port). That is, in a case where, even upon executing the start-up process or the restart process, the multi-functional peripheral 100 has failed to start up properly, the second restart process is executed.

For example, in a case of executing the second restart process, the control portion 110 selects, as a subject network port, one of a plurality of network ports and disables the subject network port (closes the subject network port). Then, in a state where the subject network port is disabled, the control portion 110 executes the restart process. The restart process may be executed also in a state where all of the plurality of network ports are disabled (a state where communication with the external devices 200 is completely interrupted).

After that, in a case where, even upon executing the second restart process, the multi-functional peripheral 100 has failed to start up properly, the control portion 110 selects, as a new subject network port, an unselected one of the plurality of network ports that is yet to be selected as a subject network port. Further, in a state where the new subject network port is disabled, the control portion 110 executes the restart process. At this time, the control portion 110 enables the network port disabled at the time of previous execution of the restart process (opens the network port). That is, the number of network ports disabled at the time of execution of the restart process is one.

Thereafter, when the multi-functional peripheral 100 fails to start up properly, a subject network port is newly selected, and the second restart process is repeatedly performed. In a case, however, where even upon executing the second restart process, the multi-functional peripheral 100 has failed to start up properly, and there is no unselected one of the network ports, the restart process is ended at that point in time. For example, the control portion 110 controls the ROM 112 to store information related to a network port selected as a subject network port (information indicating a port number or the like). Further, based on the information related to a network port stored in the ROM 112, the control portion 110 determines an unselected one of the network ports.

Figure 5:
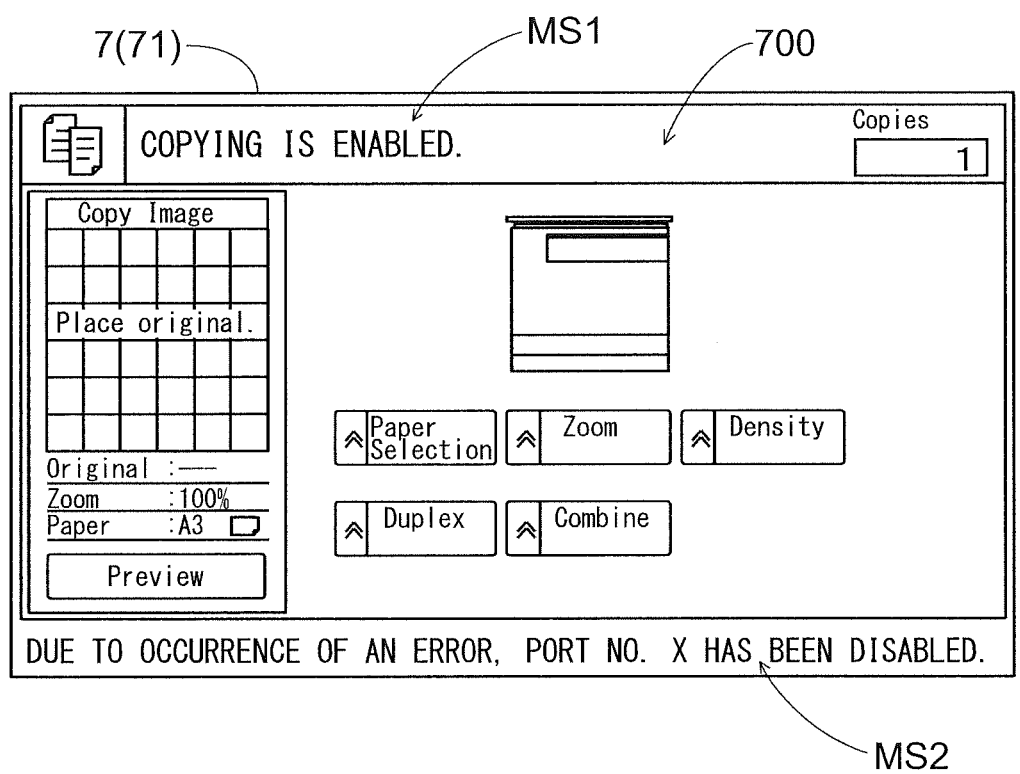
FIG. 5 is a diagram showing a setting screen (a screen including information indicating a disabled network port) displayed in the multi-functional peripheral according to the one embodiment of the present disclosure.

In a case where the multi-functional peripheral 100 has started up properly as a result of executing the restart process, the control portion 110 controls the multi-functional peripheral 100 to be shifted to the ready state. That is, the control portion 110 controls the operation panel 7 to display the setting screen 700 as shown in FIG. 4. At this time, however, one of the plurality of network ports has been disabled. Thus, for example, as shown in FIG. 5, a message MS2 for indicating a disabled network port (a port number) may be displayed within a screen of the setting screen 700.

Figure 6:
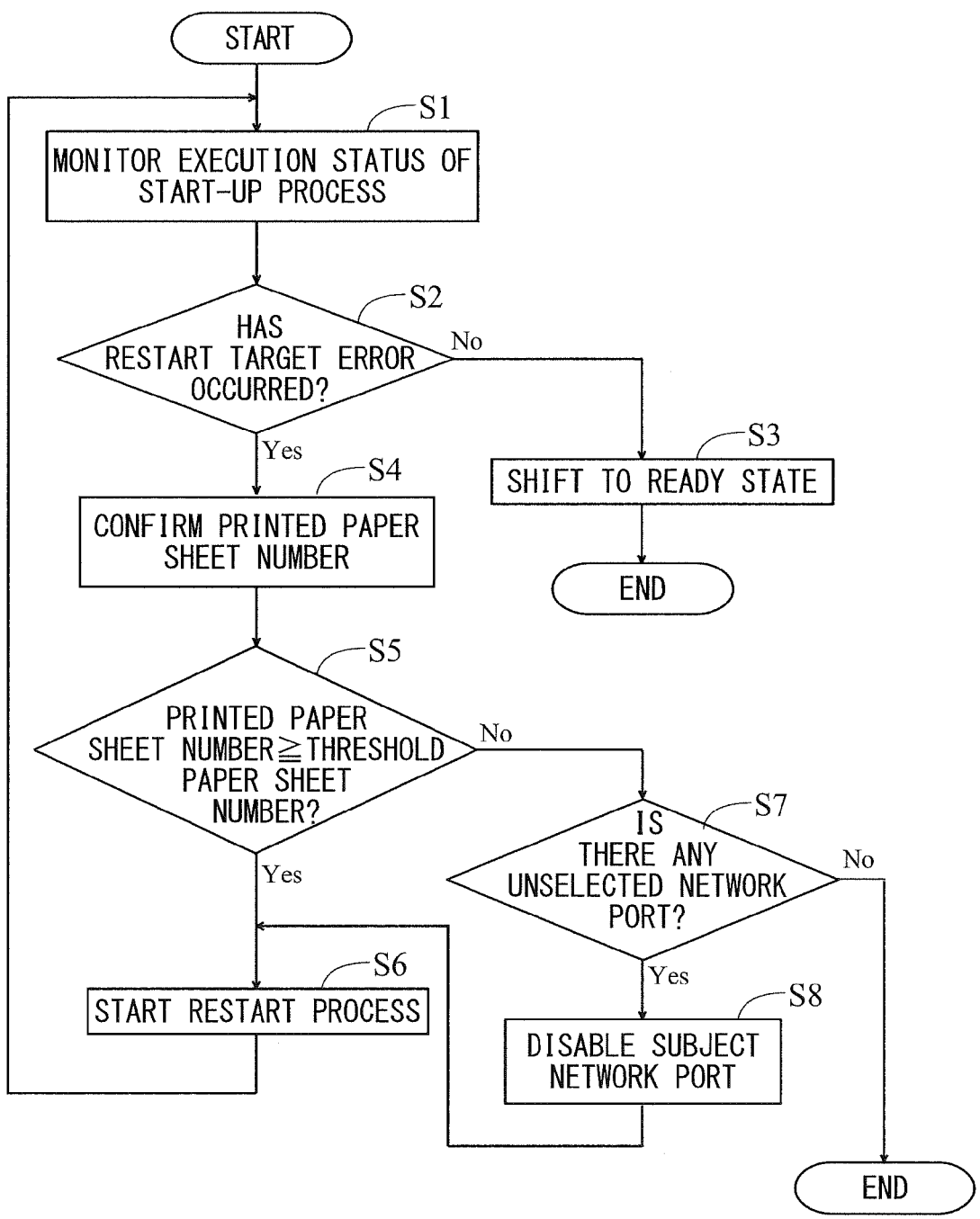
FIG. 6 is a flow chart for explaining a flow of a restart process executed in the multi-functional peripheral according to the one embodiment of the present disclosure.

With reference to a flow chart shown in FIG. 6, the following describes a flow of the restart process. A start of the flow chart shown in FIG. 6 refers to a time when the start-up process or the restart process is stated.

At Step S1, the control portion 110 monitors an execution status of the start-up process (including the restart process). Then, at Step S2, the control portion 110 judges whether or not a restart target error (an error of such a type that the multi-functional peripheral 100 could be restored to a normal state by executing the restart process) has occurred. In other words, the control portion 110 judges whether or not the multi-functional peripheral 100 has started up properly.

In a case where, at Step S2, the control portion 110 judges that a restart target error has not occurred (the multi-functional peripheral 100 has started up properly), a transition is made to Step S3. Upon the transition to Step S3, the control portion 110 controls the multi-functional peripheral 100 to be shifted to the ready state.

In a case where, at Step S2, the control portion 110 judges that a restart target error has occurred (the multi-functional peripheral 100 has not started up properly), a transition is made to Step S4. Upon the transition to Step S4, the control portion 110 confirms a printed paper sheet number indicated by the selection criterion information (a printed paper sheet number since previous execution of the process for starting up the multi-functional peripheral 100). After that, at Step S5, the control portion 110 judges whether or not the printed paper sheet number is not less than the threshold paper sheet number.

In a case where, at Step S5, the control portion 110 judges that the printed paper sheet number is not less than the threshold paper sheet number, a transition is made to Step S6. Upon the transition to Step S6, the control portion 110 starts the restart process (the reboot process) without disabling a network port. That is, the control portion 110 executes the first restart process.

In a case where, at Step S5, the control portion 110 judges that the printed paper sheet number is less than the threshold paper sheet number, a transition is made to Step S7. Upon the transition to Step S7, the control portion 110 judges whether or not, among the plurality of network ports, there is any unselected one that is yet to be selected as a subject network port. When a result thereof shows that there is any unselected one of the network ports, a transition is made to Step S8.

Upon the transition to Step S8, the control portion 110 selects, as a subject network port, one of unselected ones of the plurality of network ports and disables the subject network port (closes the subject network port). Then, a transition is made to Step S6. In this case, the restart process is started in a state where the subject network port is disabled. That is, the second restart process is executed.

Upon the start of the restart process, a return is made to Step S1. That is, after the start of the restart process, an execution status of the restart process is monitored by the control portion 110. Further, in a case where the multi-functional peripheral 100 has started up without occurrence of a restart target error, a transition is made from Step S2 to Step S3.

On the other hand, in a case where, due to occurrence of a restart target error, the multi-functional peripheral 100 has failed to start up properly, a transition is made from Step S2 to Step S4 at which a printed paper sheet number indicated by the selection criterion information is confirmed by the control portion 110. Then, at Step S5, the control portion 110 judges whether or not the printed paper sheet number is not less than the threshold paper sheet number. At this time, based on a fact that the multi-functional peripheral 100 has failed to start up properly as a result of previously performing the restart process, the control portion 110 judges that the printed paper sheet number is less than the threshold paper sheet number (a transition is made to Step S7). Thus, in a case where the restart process of the multi-functional peripheral 100 is repeatedly performed a plurality of times in a continuous manner, second and subsequent restart processes executed are the second restart process (in no case is the first restart process repeated).

Here, in a case where, at Step S7, the control portion 110 judges that there is no unselected one of the network ports, this flow is ended (the restart process is ended). That is, the second restart process is executed only in a case where there is any unselected one of the network ports. Thus, in no case is the restart process repeated endlessly.

As described above, the multi-functional peripheral 100 (the image forming apparatus) of this embodiment is provided with the communication portion 120 that is connected to the external device 200 via the network NW and communicates with the external device 200 and the control portion 110 that controls communication by the communication portion 120 and executes the restart process for restarting the multi-functional peripheral 100. Further, when a restart target error has occurred, the control portion 110 executes the restart process in a state where a network port used for communication with the external device 200 is disabled.

According to the configuration of this embodiment, in a case of occurrence of a restart target error, the restart process is executed in a state where a network port used for communication with the external device 200 is disabled (a state where the network port is closed). That is, at the time of execution of the restart process, access from the external device 200 to the multi-functional peripheral 100 is made unavailable. This can suppress an inconvenience that, at the time of execution of the restart process, due to occurrence of an error attributable to communication with the external device 200, the multi-functional peripheral 100 fails to start up properly.

Furthermore, in this embodiment, as described above, there exist a plurality of network ports used for communication with the external devices 200. In this case, when the restart process is executed in a state where one of the plurality of network ports is disabled (without requiring that all of the plurality of network ports be disabled), the multi-functional peripheral 100 may start up properly. Base on this, at the time of execution of the restart process, the control portion 110 selects, as a subject network port, one of the plurality of network ports and disables only said one of the plurality of network ports selected as the subject network port. Thus, in a case where, as a result of executing the restart process, the multi-functional peripheral 100 has started up properly, while a disabled one of the plurality of network ports (one of the plurality of network ports selected as a subject network port) is unavailable, remaining ones of the plurality of network ports are made available.

By the way, even in a case where, even upon executing the restart process in a state where a certain network port is disabled, the multi-functional peripheral 100 has failed to start up properly, when the restart process is executed in a state where another network port is disabled, the multi-functional peripheral 100 may start up properly.

Based on this, in this embodiment, as described above, when the restart process is repeatedly executed (when, as a result of previous execution of the restart process, the multi-functional peripheral 100 has failed to start up properly), the control portion 110 selects, as a new subject network port, an unselected one of the plurality of network ports that is yet to be selected as a subject network port, and disables the new subject network port. In this case, however, when there is no unselected one of the plurality of network ports, the control portion 110 does not execute the restart process. This can suppress an endless repetition of the restart process.

Furthermore, in this embodiment, as described above, when a restart target error has occurred, the control portion 110 judges whether or not a printed paper sheet number since previous execution of the process for starting up the multi-functional peripheral 100 is less than the threshold paper sheet number. When the printed paper sheet number is not less than the threshold paper sheet number, the control portion 110 executes the restart process (the first restart process) without disabling a network port, while when the printed paper sheet number is less than the threshold paper sheet number, the control portion 110 executes the restart process (the second restart process) in a state where a network port is disabled. Thus, in a case where, after proper start-up of the multi-functional peripheral 100, a printed paper sheet number has reached the threshold paper sheet number and then a restart target error has occurred, the first restart process is executed first. Further, in a case where, as a result of executing this first restart process, the multi-functional peripheral 100 has started up properly, all of the plurality of network ports are made available. On the other hand, in a case where a restart target error has occurred without a printed paper sheet number reaching the threshold paper sheet number, that is, in a case where there is a possibility that there has occurred a restart target error attributable to communication between the multi-functional peripheral 100 and the external device 200, the second restart process is executed. Thus, even when there has occurred a restart target error attributable to communication between the multi-functional peripheral 100 and the external device 200, it is possible to start up the multi-functional peripheral 100.

The embodiment disclosed herein is to be construed in all respects as illustrative and not limiting. The scope of the present disclosure is indicated by the appended claims rather than by the foregoing description of the embodiment, and all changes that come within the meaning and range of equivalency of the claims are intended to be embraced therein.

What is claimed is:

1. An image forming apparatus, comprising:
    a communication portion that is connected to an external device via a network and communicates with the external device; and
    a control portion that controls communication by the communication portion and executes a restart process for restarting the image forming apparatus,
    wherein
    when a preset restart target error has occurred, the control portion executes the restart process in a state where a network port used for communication with the external device is disabled.

2. The image forming apparatus according to claim 1, wherein
    as the network port used for communication with the external device, there exist a plurality of network ports, and
    when the restart target error has occurred, the control portion selects, as a subject network port, one of the plurality of network ports and executes the restart process in a state where the subject network port is disabled.

3. The image forming apparatus according to claim 2, wherein
    when, even upon executing the restart process, the image forming apparatus has failed to start up properly, the control portion selects, as a new subject network port, an unselected one of the plurality of network ports that is yet to be selected as the subject network port and executes the restart process in a state where the new subject network port is disabled.

4. The image forming apparatus according to claim 3, wherein
    when there is no network port as the unselected one of the plurality of network ports, the control portion does not execute the restart process.

5. The image forming apparatus according to claim 1, wherein
    when the restart target error has occurred, the control portion judges whether or not a number of paper sheets that have been printed since previous execution of a process for starting up the image forming apparatus is less than a threshold number of paper sheets, and
    when the number of paper sheets that have been printed is not less than the threshold number of paper sheets, the control portion executes the restart process without disabling the network port, while when the number of paper sheets that have been printed is less than the threshold number of paper sheets, the control portion executes the restart process in a state where the network port is disabled.

* * * * *